United States Patent
Schultz et al.

(10) Patent No.: US 6,546,666 B2
(45) Date of Patent: *Apr. 15, 2003

(54) FISHING JIG LURE

(76) Inventors: Benjamin I. Schultz, 3706 N. Ocean Blvd., Ft.Lauderdale, FL (US) 33308; Leslie A. Thomas, 3706 N. Ocean Blvd., Ft.Lauderdale, FL (US) 33308

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 35 days.

(21) Appl. No.: 09/405,874

(22) Filed: Sep. 24, 1999

(65) Prior Publication Data
US 2001/0013193 A1 Aug. 16, 2001

(51) Int. Cl.[7] ............................................. A01K 85/01
(52) U.S. Cl. ........................ 43/17.6; 43/42.39; 43/42.47
(58) Field of Search ................................ 43/17.5, 17.6, 43/42.39, 42.47, 43.13

(56) References Cited

U.S. PATENT DOCUMENTS

| | | | | |
|---|---|---|---|---|
| 2,007,045 A | * | 7/1935 | Francis | 43/42.39 |
| 2,598,471 A | * | 5/1952 | Waite | 43/17.6 |
| 2,644,265 A | * | 7/1953 | Strettner | 43/42.39 |
| 2,820,314 A | * | 1/1958 | Scott | 43/42.39 |
| 2,938,293 A | * | 5/1960 | Richardson | 43/42.39 |
| 3,535,812 A | * | 10/1970 | Crecelius | 43/17.6 |
| 3,762,092 A | | 10/1973 | Bercz et al. | 43/17.6 |
| 3,828,177 A | * | 8/1974 | Day | 43/17.6 |
| 3,940,868 A | * | 3/1976 | Northcutt | 43/17.6 |
| 3,940,871 A | * | 3/1976 | Evans | 43/43.13 |
| 4,114,305 A | * | 9/1978 | Wohlert et al. | 43/17.6 |
| 4,157,627 A | * | 6/1979 | Tschelisnik | 43/17.5 |
| 4,250,650 A | * | 2/1981 | Fima | 43/17.6 |
| 4,347,681 A | * | 9/1982 | Fima | 43/17.6 |
| 4,638,584 A | | 1/1987 | Lindsay | 43/17.6 |
| 4,741,120 A | * | 5/1988 | Cota et al. | 43/17.6 |
| 4,799,327 A | * | 1/1989 | Treon | 43/17.6 |
| 4,819,361 A | * | 4/1989 | Boharski | 43/17.6 |
| 4,839,983 A | * | 6/1989 | Pippert | 43/17.6 |
| 4,888,905 A | * | 12/1989 | Garr | 43/17.6 |
| 4,972,623 A | * | 11/1990 | Delricco | 43/17.6 |
| 5,063,700 A | * | 11/1991 | Kierfer et al. | 43/17.6 |
| 5,119,581 A | * | 6/1992 | Rudolph | 43/42.39 |
| 5,185,951 A | * | 2/1993 | Hemmerle | 43/43.13 |
| 5,309,666 A | * | 5/1994 | Prince | 43/43.13 |
| 5,461,815 A | * | 10/1995 | Rodgers | 43/17.6 |
| 5,495,690 A | * | 3/1996 | Hunt | 43/17.6 |
| 5,697,182 A | * | 12/1997 | Rodgers | 43/17.6 |
| 5,758,450 A | * | 6/1998 | Young | 43/17.6 |
| 5,806,234 A | * | 9/1998 | Nichols | 43/42.39 |
| 5,903,212 A | * | 5/1999 | Rodgers | 43/17.5 |
| 5,979,101 A | * | 11/1999 | Muenchow | 43/17.5 |
| 5,983,553 A | * | 11/1999 | Gordon | 43/17.6 |
| 5,987,802 A | * | 11/1999 | Caprio | 43/17.6 |
| 6,055,763 A | * | 5/2000 | Trotter | 43/17.6 |
| 6,079,144 A | * | 6/2000 | Morgan et al. | 43/17.6 |
| 6,318,016 B1 | * | 11/2001 | Ellig | 43/17.6 |
| 6,336,288 B1 | * | 1/2002 | Foss | 43/17.6 |

* cited by examiner

*Primary Examiner*—Darren W. Ark
(74) *Attorney, Agent, or Firm*—Oltman, Flynn & Kubler

(57) ABSTRACT

A jig-type fishing lure has a weighted lure body holding a gravity-operated switch that controls the energization of an LED for illuminating fiber optic strands extending from the tail end of the lure body in proximity to a fishhook. A heat shrunk tube in the lure body holds the LED and the adjacent ends of the fiber optic strands.

8 Claims, 2 Drawing Sheets

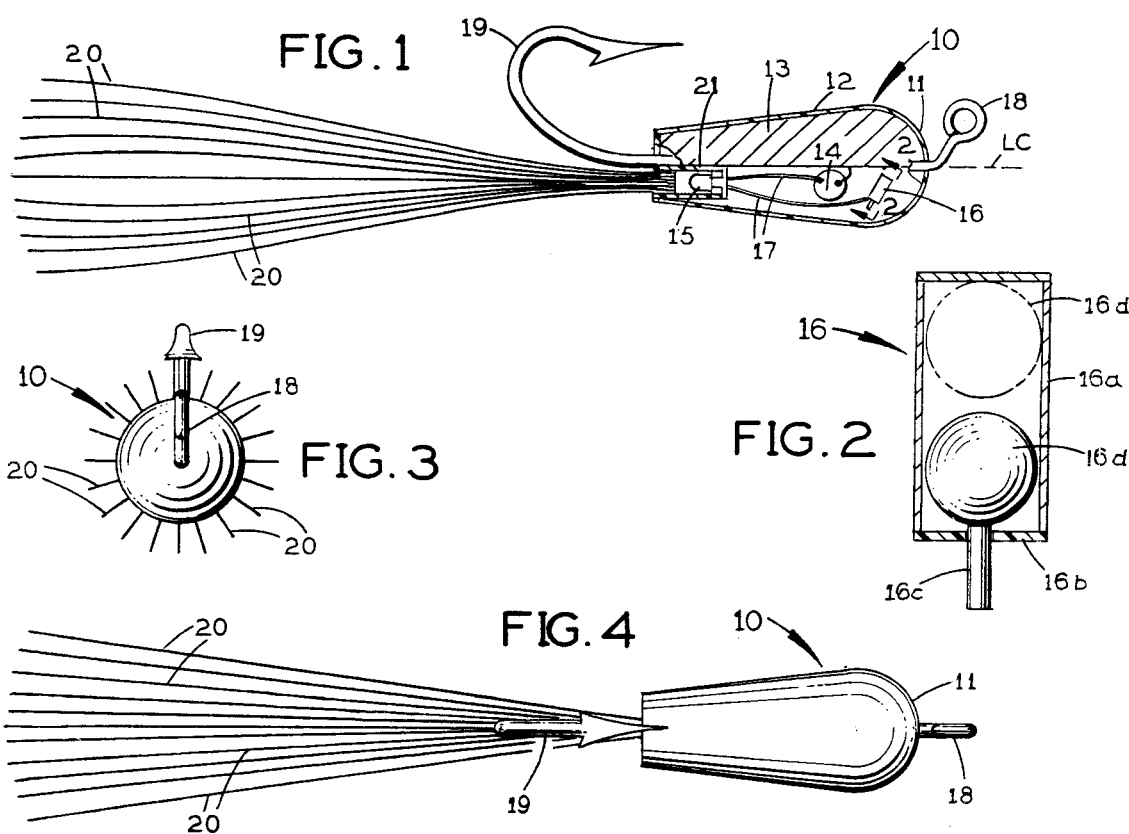

FISHING JIG LURE

BACKGROUND OF THE INVENTION

1. Field of the Invention

This invention relates to a fishing jig lure having illuminated fiber optic elements for attracting fish.

2. Prior Art

Various fishing lures have been proposed heretofore which use illuminated fiber optics to attract fish.

U.S. Pat. No. 3,828,177 to Day discloses such a fishing lure having a light bulb as the source of illumination for optical fibers and arranged to have its circuit to a battery closed by tightening a cap on the lure body. This technique for turning on the light bulb in a lure of this general type is disclosed also in Kiefer et al U.S. Pat. No. 5,063,700 and in Garr U.S. Pat. No. 4,888,905, which has the entire lure body as a single fiber optic.

Treon U.S. Pat. No. 4,799,327 discloses a fiber optic fishing lure in which the connection of a battery to an LED for illuminating the fiber optics is under the control of a switch that is operated by manual pressure on the outside of the lure body.

Fima U.S. Pat. Nos. 4,250,650 and 4,347,681 and Wohlert et al U.S. Pat. No. 4,114,305 disclose lures with optical fibers that are illuminated intermittently in response to the lure's movement through the water.

In Northcutt U.S. Pat. No. 3,940,868 the energization of an LED in a fishing lure is controlled by a water-activated switch probes that are exposed to the water, or by metal eyes that are bridged by a snap attachment clip on the end of a fishing line, or by a screw-in cap on the lure body.

In Cota et al U.S. Pat. No. 4,741,120 a self-illuminating fishing lure has tritium as the light source and has a weight encapsulated in the lure body.

In Delricco U.S. Pat. No. 4,972,623 fishing jig lure has a light emitting ball on a fish hook. The ball holds two liquids that normally are separated but can be mixed by applying pressure on the ball, and the chemical reaction between them produces light to illuminate the ball itself and optical fiber strands near the hook end of the fish hook.

BRIEF DESCRIPTION OF THE DRAWINGS

FIG. 1 is a longitudinal sectional view of a lure in accordance with a first embodiment of the present invention;

FIG. 2 is a longitudinal sectional view of the gravity-operated switch in this lure, taken along the line 2—2 in FIG. 1;

FIG. 3 is an end elevation of the FIG. 1 lure taken from its head end (the left end in FIG. 1);

FIG. 4 is a top plan view of the FIG. 1 lure;

DETAILED DESCRIPTION OF THE PRESENT INVENTION

Figure 5:
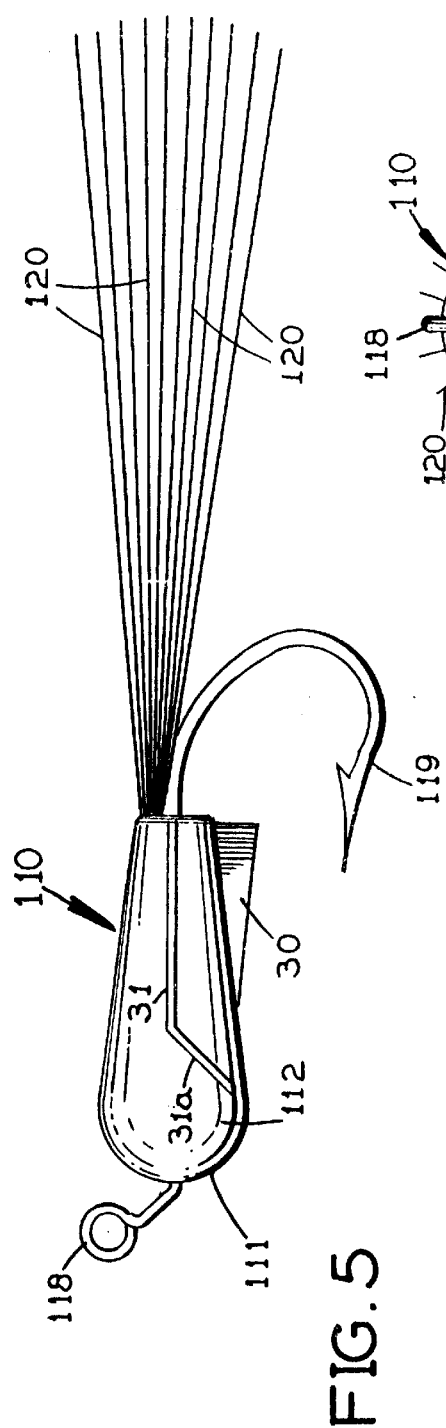
FIG. 5 is a side elevation of a lure in accordance with a second embodiment of this invention.

Before explaining the disclosed embodiments of the present invention in detail it is to be understood that the invention is not limited in its application to the particular arrangements shown since the invention is capable of other embodiments. Also, the terminology used herein is for the purpose of description and not of limitation.

Referring to FIG. 1, the body or housing 10 presents a convex head end 11 (the left end in FIG. 1) and an annular external surface 12 which tapers inwardly toward the tail end of the lure body. The lure body is half solid plastic, preferably an opaque plastic, containing and sealing the circuit, and half solid lead or other suitable heavy material to make the lure body heavy enough to sink on a jig. The lead may be on either side of the lure because the orientation of the lure is determined by the angle of the eye 18 as eye 18 emerges from the body, and not by the location of the lead. The drag of the line on the eye 18 always orients the jig so that the eye 18 points upwardly. The body may be painted.

The solid plastic half of the lure body contains a battery 14, an LED (light emitting diode) 15 facing toward the tail end of the lure body, a gravity-operated switch 16, and electrical wiring 17 connecting switch 16 in series with LED 15 across battery 14. With this arrangement, the gravity-operated switch 16 controls the energization of LED 15 from battery 14 such that when the switch is closed the LED is on, and when the switch is open the LED is off.

FIG. 2 shows the gravity-operated switch 16 in enlarged detail. It comprises a tubular housing 16a of electrically conductive metal that is closed at its upper end and at its lower end carries an end plate 16b of dielectric material through which a terminal pin 16c of electrically conductive metal extends. A ball 16d of electrically conductive metal, such as a conventional ball bearing, is in rolling contact with the inside of metal housing 16a and acts as a mobile contact in the operation of the switch. In one practical embodiment, the height of switch housing 16a (its largest dimension) is about 0.25 inch, and the complete switch is very light compared to the lead weight 13.

When the longitudinal centerline LC of the lure body 10 is generally horizontal, the switch housing 16a extends upward and rearward at a small inclination to the vertical when the angle of the eye 18 stem extends upwardly, as shown in FIG. 1. In this position of the switch housing, gravity causes the ball 16d to engage terminal pin 16c, as shown if full lines in FIG. 2, and provide an electrically conductive path between housing 16a and pin 16c. When the lure body is inverted from the position shown in FIG. 1, the ball 16d will roll away from pin 16c to the phantom-line position in FIG. 2. The electrical wiring 17 has separate connections to switch housing 16a and to terminal pin 16c, so that the position of ball 16d (under the influence of gravity) determines whether switch 16 is closed or not, and thus whether LED 15 is energized or not. The influence of gravity also acts to keep the switch closed as the lure is jigged up and down in the water. Consequently, gravity determines that LED 15 is on substantially all the time the lure is in the water except when it might be temporarily upset by water turbulence or some other cause. But after such upset the upward and forward inclination of the eye 18 as the fishing line pulls the lure through the water will return the lure body to the position in which the gravity-operated switch 16 is closed and the LED is on.

As shown In FIG. 1, the eye 18 extends forward and upward from the head end 11 of lure body 10 for attaching it to a fishing line, the angle of eye 18 relative to lure body 10 once again being selected to orient the lure body as desired. A fishhook 19 is rigidly joined to the lure body in any suitable fashion and extends beyond and below its tail end.

A bundle or cluster of optical fiber strands extends from the tail end of the lure body immediately adjacent to the fishhook 19. The optical fiber strands at one end are held in the lure body by a heat-shrunk plastic tube 21 which also receives LED 15, positioning it to shine light onto the adjacent ends of the fiber optic strands 20.

As is well known, the fiber optic strands emit light at their ends remote from the light source. Fish are attracted by the light emitted by the fiber optic strands, and mistaking it for a meal, strike at the strands and are caught by fishhook 19.

Figure 7:
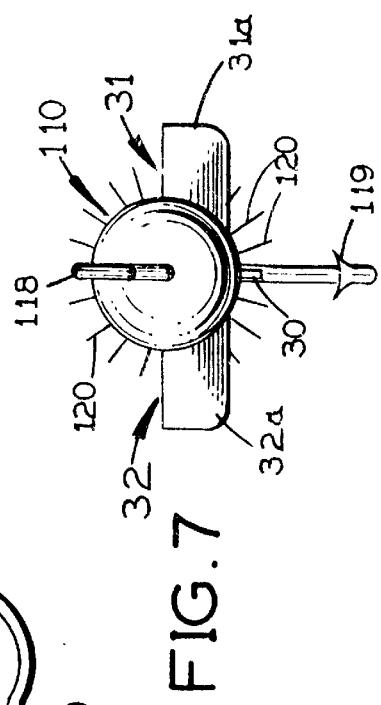
FIG. 7 is an end elevation taken from the head end of the FIG. 5 lure.
Figure 6:
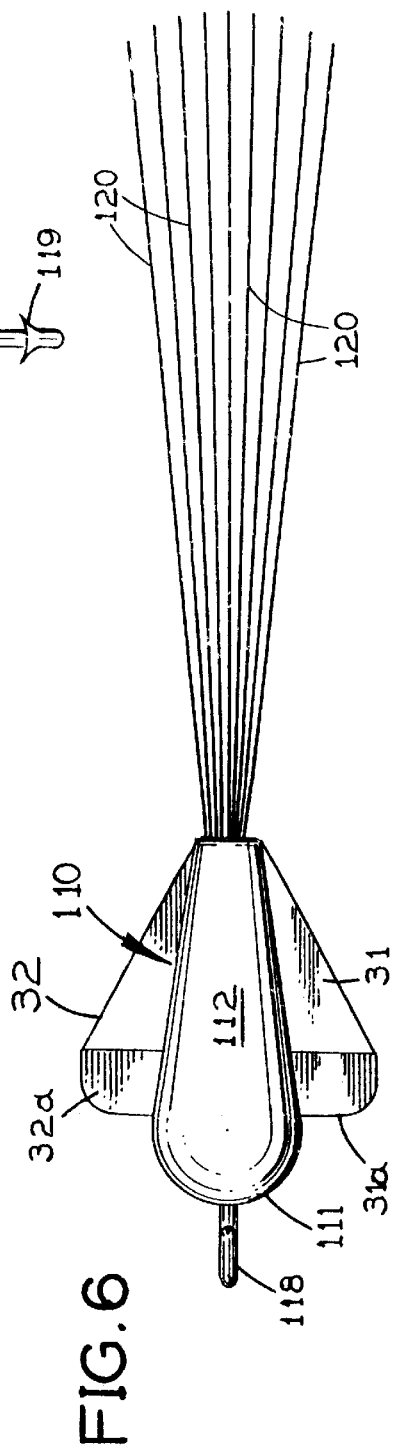
FIG. 6 is a top plan view of the FIG. 5 lure.

FIGS. 5–7 show a second embodiment of the invention, corresponding elements of which have the same reference numerals, plus 100, as those in the first embodiment. The description of these corresponding elements will not be repeated. The arrangement of the battery, the gravity-operated switch, and the LED is the same as in FIG. 1, so these features are not shown again.

As shown in FIG. 5, a vertical keel 30 extends down from the tapered annular exterior surface 112 of the lure body 110 toward its tail end. Wings 31 and 32 extend out from the lure body on opposite sides, presenting downwardly and forwardly inclined segments 31a and 32a at their respective front ends. Behind these inclined front segments the wings 31 and 32 are flat and substantially horizontal and extend to the tail end of the lure body in substantial alignment with the lure body's longitudinal centerline.

The wings 31 and 32 enhance the operation of the lure because their inclined front segments 31a and 32a exert a downward bias on the lure body when the lure is being trolled. The keel 30 acts to stabilize the lure. With this second embodiment of the present invention, it is possible to troll the lure through the water and jig it up and down at the same time.

What is claimed is:

1. A fishing jig hire comprising:
   a lure body having a lure body length and a lure body centerline dividing said lure body into a lure body upper half and a lure body lower half, and having a center of gravity located sufficiently below said centerline to bias said lure body upper half toward a predetermined position above said lure body lower half, said lure body having a front end and a back end;
   a light source, a battery, and a gravity-operated switch in said lure body, said switch being closed when said lure body is in said predetermined position in the water and being open when said lure body is inverted from said predetermined position;
   a fishline engaging eye attached to said lure body at its front end and extending forward and angularly upward therefrom above said centerline to normally maintain said lure body in said predetermined position in the water in response to a forward pull on said eye by a fishline attached thereto, thereby keeping said switch closed;
   and fiber optic strands carried by said lure body positioned to be illuminated by said light source, said fiber optic strands each extending behind said lure body a distance of at least said lure body length.

2. A fishing lure according to claim 1, wherein said eye is attached to said lure body above the lure body centerline.

3. A fishing lure according to claim 1, and further comprising a fishhook attached to said lure body and extending rearward therefrom in proximity to said fiber optic strands.

4. A fishing lure according to claim 1, wherein said fiber optic strands extend from connected ends secured to said lure body and terminate in free ends which are exposed outside said lure body, and further comprising:
   a heat shrink tube in said lure body encircling the connected ends of said fiber optic strands and holding said light source in proximity to said connected ends of said fiber optic strands to shine light thereon;
   and a fishhook attached to said lure body and extending therefrom in proximity to said fiber optic strands.

5. A fishing jig lure comprising:
   a lure body having a lure body length and a lure body centerline and having sufficient weight relative to its volume to sink in water;
   means for orienting said lure body in a predetermined position in the water such that a selected side of said lure body is directed upwardly;
   a light source, a battery, and a gravity-operated switch in said lure body, said switch being closed continuously when said lure body is in said predetermined position in the water and being open when said lure body is inverted from said predetermined position;
   fiber optic strands carried by said lure body positioned to be illuminated by said light source, said fiber optic strands each extending from said lure body a distance of at least said lure body length;
   and a stabilizing keel extending down from said lure body when said lure body is in said predetermined position in the water.

6. A fishing jig lure comprising:
   a lure body having a lure body length and a lure body centerline and having sufficient weight relative to its volume to sink in water;
   means for orienting said lure body in a predetermined position in the water such that a selected side of said lure body is directed upwardly;
   a light source, a battery, and a gravity-operated switch in said lure body, said switch being closed when said lure body is in said predetermined position in the water and being open when said lure body is inverted from said predetermined position;
   fiber optic strands carried by said lure body positioned to be illuminated by said light source, said fiber optic strands each extending from said lure body a distance of at least said lure body length;
   a stabilizing keel extending down from said lure body when said lure body is in said predetermined position in the water;
   and wings extending out from opposite sides of said lure body and presenting inclined end segments which exert a downward bias on the lure body as it is trolled through the water with said selected side of the lure body directed upwardly.

7. A fishing jig lure comprising:
   a lure body having a lure body length and a lure body centerline and having sufficient weight relative to its volume to sink in water;
   means for orienting said lure body in a predetermined position in the water such that a selected side of said lure body is directed upwardly;
   a light source, a battery, and a gravity-operated switch in said lure body, said switch being closed when said lure body is in said predetermined position in the water and being open when said lure body is inverted from said predetermined position;
   fiber optic strands carried by said lure body positioned to be illuminated by said light source, said fiber optic strands each extending from said lure body a distance of at least said lure body length;

and a stabilizing keel extending down from said lure body when said lure body is in said predetermined position in the water;

and further comprising wings extending laterally out from said lure body on opposite sides thereof near said longitudinal centerline, each of said wings at a head end terminating in a downwardly inclined segment for exerting a downward bias on the lure body as it is trolled through the water.

8. A fishing jig lure comprising:

a lure body having a lure body length and a lure body centerline dividing said lure body into a lure body upper half and a lure body lower half, and having a center of gravity located sufficiently below said centerline to bias said lure body upper half toward a predetermined position above said lure body lower half;

a light source, a battery, and a gravity-operated switch in said lure body, said switch being closed when said lure body is in said predetermined position in the water and being open when said lure body is inverted from said predetermined position;

fiber optic strands carried by said lure body positioned to be illuminated by said light source, said fiber optic strands each extending from said lure body a distance of at least said lure body length, said fiber optic strands extending from connected ends secured to said lure body and terminating in free ends which are exposed outside said lure body, and further comprising:

a heat shrink tube in said lure body encircling the connected ends of said fiber optic strands and holding said light source in proximity to said connected ends of said fiber optic strands to shine light thereon;

a fishhook attached to said lure body and extending therefrom in proximity to said fiber optic strands;

a stabilizing keel extending down from said lure body when said lure body is in said predetermined position in the water;

and wings extending laterally out from said lure body on opposite sides thereof near said lure body centerline, each of said wings at a head end terminating in a downwardly inclined segment for exerting a downward bias on the lure body as it is trolled through the water with said lure body upper half directed upward.

\* \* \* \* \*